Oct. 8, 1963   C. F. WILTSE ETAL   3,106,350
PORTABLE LIGHT FOR FISHERMAN
Filed June 11, 1962

CHARLES F. WILTSE
CLEMENCE ESCH
INVENTORS

BY Edward M. Apple
ATTORNEY

3,106,350
PORTABLE LIGHT FOR FISHERMAN
Charles F. Wiltse, 325 N. Center St., and Clemence H.
Esch, 4830 Gettel Road, both of Sebewaing, Mich.
Filed June 11, 1962, Ser. No. 201,471
4 Claims. (Cl. 240—59)

This invention relates to fishing accessories and has particular reference to a device for transporting a lantern while fishing.

An object of the invention is to provide a fisherman with a portable light, so that he may pursue his nocturnal activities of wading, and casting and the like, with his hands and arms free and unencumbered, except for the fishing gear needed for the immediate operation.

Another object of the invention is to provide a device of the character indicated, which is constructed and arranged so that the fisherman always has a light source positioned in front of him at a height which will enable him to see well in front and at the side of him, yet he will not be blinded in his work because of the light shining directly into his eyes.

Another object of the invention is to provide a lantern harness for a fisherman which is constructed and arranged so that the light source is positioned to one side of his body, so that it will produce a minimum of interference to his normal fishing movements.

Another object of the invention is to provide a lantern harness for a fisherman which is light in weight, easily put on and taken off and one which is very stable under any and all working conditions.

Another object of the invention is to provide a device of the character indicated, which is provided with an anchor strap for attachment to the wearer's belt, whereby to counteract the weight of the lantern.

A further object of the invention is to generally improve such devices and to provide a device which is simple in construction, economical to manufacturre and efficient in operation.

The foregoing and other objects and the advantages of the invention will become more apparent as the description proceeds, reference being made from time to time to the accompanying drawing, forming part of the within disclosure in which drawing.

Figure 1:
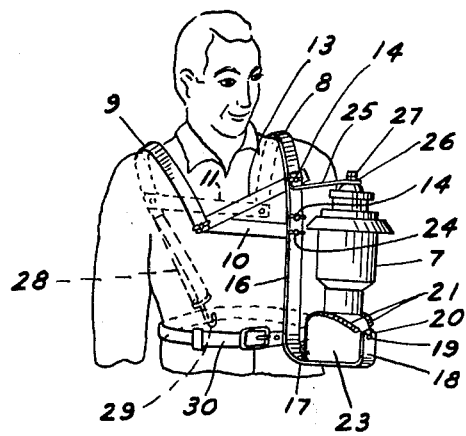
FIG. 1 is a fragmentary front perspective view of a fisherman equipped with the device embodying the invention.
Figure 2:
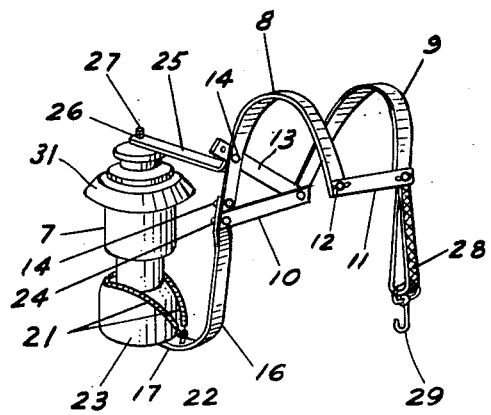
FIG. 2 is a rear view in perspective of the device embodying the invention.
Figure 4:
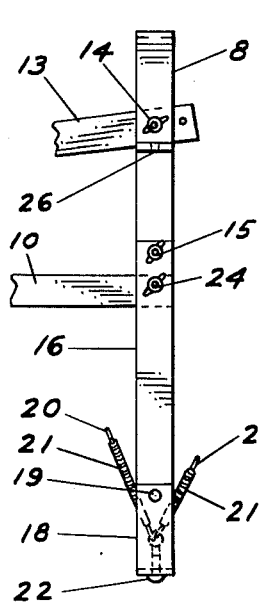
FIG. 4 is an enlarged fragmentary front elevational view of the harness shown in FIG. 3, with the spring members and hooks removed.
Figure 3:
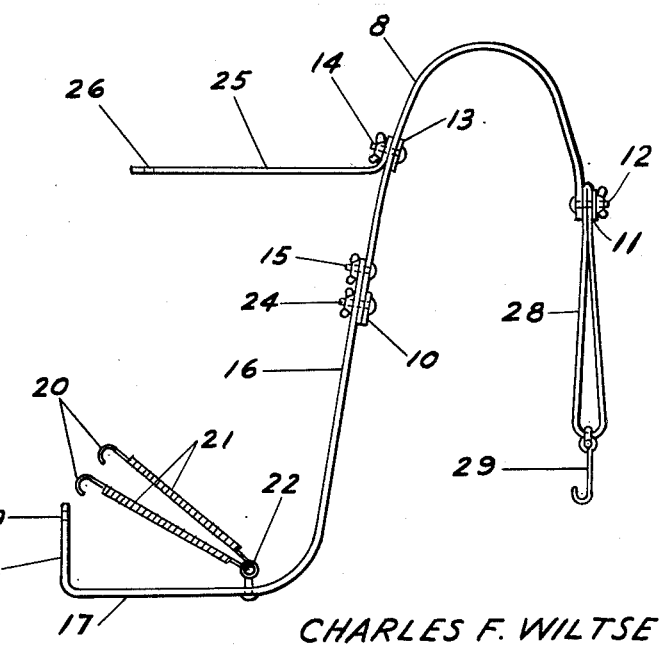
FIG. 3 is an enlarged side elevational view of the harness with the lantern removed.

Referring now more particularly to the drawings, it will be understood that in the embodiment herein disclosed, the reference character 7 indicates a gasoline, or other type of lantern, which is mounted on the harness hereinafter described. The supporting harness which is shown attached to the body of a fisherman consists of a pair of rigid metal straps 8 and 9 which extend from the breast of the wearer to points on his shoulders. The straps 8 and 9 are tied together at their ends by cross members 10 and 11, which are preferably secured to the straps by bolts and wing nuts, as at 12. A third cross member 13 extends from the front end of the strap 9 to an intermediate point 14 on the strap 8. This serves to reinforce the straps and prevents weaving. Secured to the lower end of the strap 8, as at 15, is a downwardly and outwardly extending member 16. The member 16 has a comparatively flat portion 17 on which the lantern 7 is adapted to rest. The free end of the memer 16 is upwardly directed, as at 18, and is provided with a lateral bore 19 which is arranged to receive the hooks 20 carried at the ends of a pair of expansion springs 21. The opposite ends of the springs are secured to an eye bolt 22, which in turn is secured in a suitable opening formed in the flat member 17. The expansion springs 21 are arranged to extend over and frictionally engage the base portion 23 of the lantern 7 and secures the lantern on the member 17. The extension member 16 is adjustable on the strap 8 by means of bolts and wing nuts 24, so that the length of the extension member 16 may be altered. Extending forwardly from the point 14 on the strap 8 is a lateral arm 25 which has an opening 26 at the forward end arranged to receive a stud formed on the top of the lantern 7. A knurled nut 27 engages the stud to secure the arm 25 to the lantern.

An elastic strap 28 is secured to the lower end of the strap 9 and is provided with a hook 29 which is adapted to be secured under the belt 30 of the fisherman. Inasmuch as the elastic strap 28 is secured at the end of the rigid strap 9, and the extension member 16 is secured to the opposite end of the rigid strap 8, it is obvious that the lantern 7 will be given great stability on the body of the fisherman.

A harness constructed as herein described positions the lantern 7 somewhat to the left of the center of the fisherman's body and low enough so that the water or ground is well illuminated in front of and to the left side of the fisherman. By the same token, the lantern is off-center so that the fisherman's right arm is free to function in its normal manner. It will also be noted that the lantern 7 is provided with a light shield 31 which directs the rays of light from the lantern downwardly and keeps the light out of the eyes of the fisherman, so that he may go about his fishing activities without difficulty.

It is believed that the operation of the device is obvious from the foregoing description.

Having described our invention, what we claim and desire to secure by Letters Patent is:

1. A device of the character described to be worn by a fisherman comprising the combination of a pair of arched, rigid shoulder straps, extending from points on the wearer's chest to ponts on the wearer's back, rigid lateral members connecting the ends of said straps,, a rigid member adjustably secured to the end of one of said straps and extending downwardly and forwardly therefrom and terminating in an upwardly extending leg positioned to one side of the center of the device, a lantern supported on the forwardly extending portion of said rigid member, and a pair of expansion springs secured at one end to said forwardly extending portion and secured at the other end to said upwardly extending leg, said springs being in close frictional engagement with the opposite sides of said lantern to secure said lantern to said rigid member.

2. The structure of claim 1, in which the strap opposite the strap having said rigid extension member, is provided with an elastic extension member having a terminal element for securing to the wearer's belt.

3. The structure of claim 1, including a rigid brace extending forwardly from the strap having the said rigid extension member, from a point on said strap above said last named member to the top of said lantern and means to attach said brace to the top of said lantern.

4. The structure of claim 1, in which said lantern is provided with a shield for preventing the rays of light from said lantern from extending above the lower ends of said straps.

References Cited in the file of this patent
UNITED STATES PATENTS

| | | |
|---|---|---|
| 1,051,438 | O'Neil | Jan. 28, 1913 |
| 2,275,765 | Hummert et al. | Mar. 10, 1942 |
| 2,547,818 | Gould | Apr. 3, 1951 |
| 2,579,782 | Booth | Dec. 25, 1951 |
| 2,785,290 | Terry | Mar. 12, 1957 |